(12) United States Patent
Adams

(10) Patent No.: US 7,935,161 B1
(45) Date of Patent: May 3, 2011

(54) FILTER CARTRIDGE WITH MOUNTING APPARATUS AND METHOD OF FILTER REPLACEMENT FOR A CYCLONIC SEPARATION SYSTEM

(75) Inventor: Scott Richard Adams, Schererville, IN (US)

(73) Assignee: Bulkmatic Transport Company, Griffith, IN (US)

( * ) Notice: Subject to any disclaimer, the term of this patent is extended or adjusted under 35 U.S.C. 154(b) by 0 days.

(21) Appl. No.: 12/729,960

(22) Filed: Mar. 23, 2010

(51) Int. Cl.
*B01D 50/00* (2006.01)
(52) U.S. Cl. ............... 55/337; 55/490; 55/495; 55/497; 55/498; 55/501; 55/DIG. 37; 55/510; 55/492
(58) Field of Classification Search ............... 55/490, 55/495, 497, 498, 501, 510, DIG. 37, 357, 55/492; 95/273
See application file for complete search history.

(56) References Cited

U.S. PATENT DOCUMENTS

| | | | |
|---|---|---|---|
| 3,013,667 A * | 12/1961 | Jackson et al. ............. 210/493.1 |
| 3,386,230 A * | 6/1968 | Riesberg et al. ................ 55/337 |
| 4,017,281 A | 4/1977 | Johnstone |
| 4,075,106 A * | 2/1978 | Yamazaki ..................... 210/487 |
| 4,154,688 A * | 5/1979 | Pall ............................... 210/487 |
| 4,512,892 A * | 4/1985 | Ganzi et al. ................ 210/493.2 |
| 4,626,265 A * | 12/1986 | Adiletta ........................... 96/135 |
| 4,826,597 A * | 5/1989 | Silverwater et al. .......... 210/387 |
| 5,039,413 A * | 8/1991 | Harwood et al. ............. 210/457 |
| 5,053,063 A | 10/1991 | Sisk |
| 5,064,454 A | 11/1991 | Pittman |
| 5,071,290 A | 12/1991 | Johnson |
| 5,211,846 A | 5/1993 | Kott et al. |
| 5,336,396 A | 8/1994 | Shetley |
| 5,632,791 A | 5/1997 | Oussoren et al. |
| 5,679,122 A * | 10/1997 | Moll et al. ....................... 55/497 |
| D402,734 S * | 12/1998 | Rao et al. ..................... D23/209 |
| 5,902,482 A * | 5/1999 | Seeley et al. ............... 210/493.1 |
| 6,398,836 B1 * | 6/2002 | Frankle ........................... 55/484 |
| 6,402,800 B1 * | 6/2002 | Rey ................................. 55/498 |
| 6,712,870 B1 | 3/2004 | Stamey, Jr. et al. |
| 6,716,274 B2 * | 4/2004 | Gogins et al. .................. 95/273 |
| 6,866,693 B2 | 3/2005 | Igarashi |
| 6,887,290 B2 | 5/2005 | Strauser et al. |
| 6,942,717 B2 | 9/2005 | Armstrong et al. |
| 7,125,490 B2 | 10/2006 | Clendenning et al. |

(Continued)

OTHER PUBLICATIONS

Porex, "Porex Radial Cartridge Filter," 2006, 6 pp.

*Primary Examiner* — Jason M Greene
*Assistant Examiner* — Dung Bui
(74) *Attorney, Agent, or Firm* — Vedder Price P.C.

(57) ABSTRACT

A cyclonic separation system filter cartridge with a cylindrical body formed into at least thirty pleats having a solid bottom surface, an open top surface, a rigid inner cylindrical core, a top cap member substantially covering the open top surface except for a central circular opening, and a handle attached to either the rigid inner cylindrical core or to the top cap member, extending across the central circular opening. The pleats form a plurality of filtering chambers. Also, a mounting apparatus is disclosed that includes a top mounting flange, a retainer plate, removably connectable to the top mounting flange, a bottom plate and tie bracing connected to the mounting flange and the bottom plate, wherein the mounting apparatus is configured to be mounted, via the top mounting flange, within a cyclonic separation chamber, wherein the tie bracing is configured to extend along an internal wall of the separation chamber.

20 Claims, 8 Drawing Sheets

U.S. PATENT DOCUMENTS

| | | |
|---|---|---|
| RE40,048 E | 2/2008 | Witter |
| 7,476,267 B2 * | 1/2009 | Greene et al. ............... 55/498 |
| 7,497,886 B2 * | 3/2009 | Walker ..................... 55/385.1 |
| 7,550,021 B2 | 6/2009 | Witter |
| 7,655,062 B2 * | 2/2010 | Greene ...................... 55/482 |
| 2002/0060183 A1 * | 5/2002 | Paul et al. .................. 210/457 |
| 2004/0083694 A1 * | 5/2004 | Choi ......................... 55/357 |
| 2004/0222142 A1 * | 11/2004 | Yoshioka ................. 210/416.4 |
| 2006/0225389 A1 * | 10/2006 | Scott et al. .................. 55/498 |
| 2007/0113529 A1 * | 5/2007 | Gierer ........................ 55/498 |
| 2008/0245037 A1 * | 10/2008 | Rogers et al. ............. 55/385.3 |
| 2009/0056290 A1 | 3/2009 | Oh et al. |
| 2010/0115897 A1 * | 5/2010 | Krisko et al. ............... 55/443 |

\* cited by examiner

US 7,935,161 B1

FILTER CARTRIDGE WITH MOUNTING APPARATUS AND METHOD OF FILTER REPLACEMENT FOR A CYCLONIC SEPARATION SYSTEM

FIELD OF THE DISCLOSURE

The present disclosure is related to cyclonic separations systems and filters.

BACKGROUND

Cyclonic separation systems are known and are used for various operations, including the use on vehicles that store and transport materials such as grain, flour, etc. Such transport vehicles usually include a vacuum system that interfaces with a cyclonic separation chamber to separate fine particles from the air as bulk material is being transferred into or out of a storage tank of the vehicle. An exemplary prior system that is used in conjunction with such cyclonic separation systems is illustrated in FIG. 1. FIG. 1 illustrates a cyclonic chamber 101 which utilizes a plurality of filter tubes 109. The filter tubes are housed within the cyclonic separation chamber 101 which also includes a manifold 105 having a hinged cover 107. The manifold includes appropriate air inlets and outlets such that the cyclonic chamber 101 may properly function. However other variations with various locations of the air inlets and outlets are possible and, for example, the cyclonic chamber 101 may have inlets and/or outlets connected directly to the chamber. The chamber 101 will additionally have an outlet at the end of the bottom conical section from which the separated particles may be removed. As shown in FIG. 1, the filter requires many individual filter tubes such as filter tube 111, arranged in a plurality of filter tubes 109 as shown by using a filter tube arrangement plate 113, and, in some cases, an additional inner sleeve 113. Other components, which are not shown in FIG. 1, may also be needed. The filter tube plate 113 mounts on top of a mounting flange of the cyclonic chamber 101 and includes a plurality of holes with each hole for supporting one tube 111 of the plurality of filter tubes 109. This type of arrangement poses several difficulties for operation. One such difficulty is that, if one filter tube 111 of the plurality of filter tubes 109 requires replacement, the hinged cover 107 and manifold 105 may need to be removed to access the tube. Further, removal of any one tube 111 from the plate 113 can result in contamination of the other tubes of the plurality of filter tubes 109 because contaminants may fall from the removed tube 111 and land within the clean tubes. Also, the number of tubes need is large and may be on the order of between 200 to 300, such as, for example 292 tubes. Many or all of the tubes may need to be replaced if contaminated, and this can be a costly operation. In normal operation, 6 to 7 replacements of at least one or all of the tubes is required on an annual basis, adding further cost of operation. Further, the time required to remove and replace tubes can be on the order of several hours. Therefore the prior cyclonic separation system 100 illustrated in FIG. 1 has several disadvantages.

DETAILED DESCRIPTION

Figure 1:
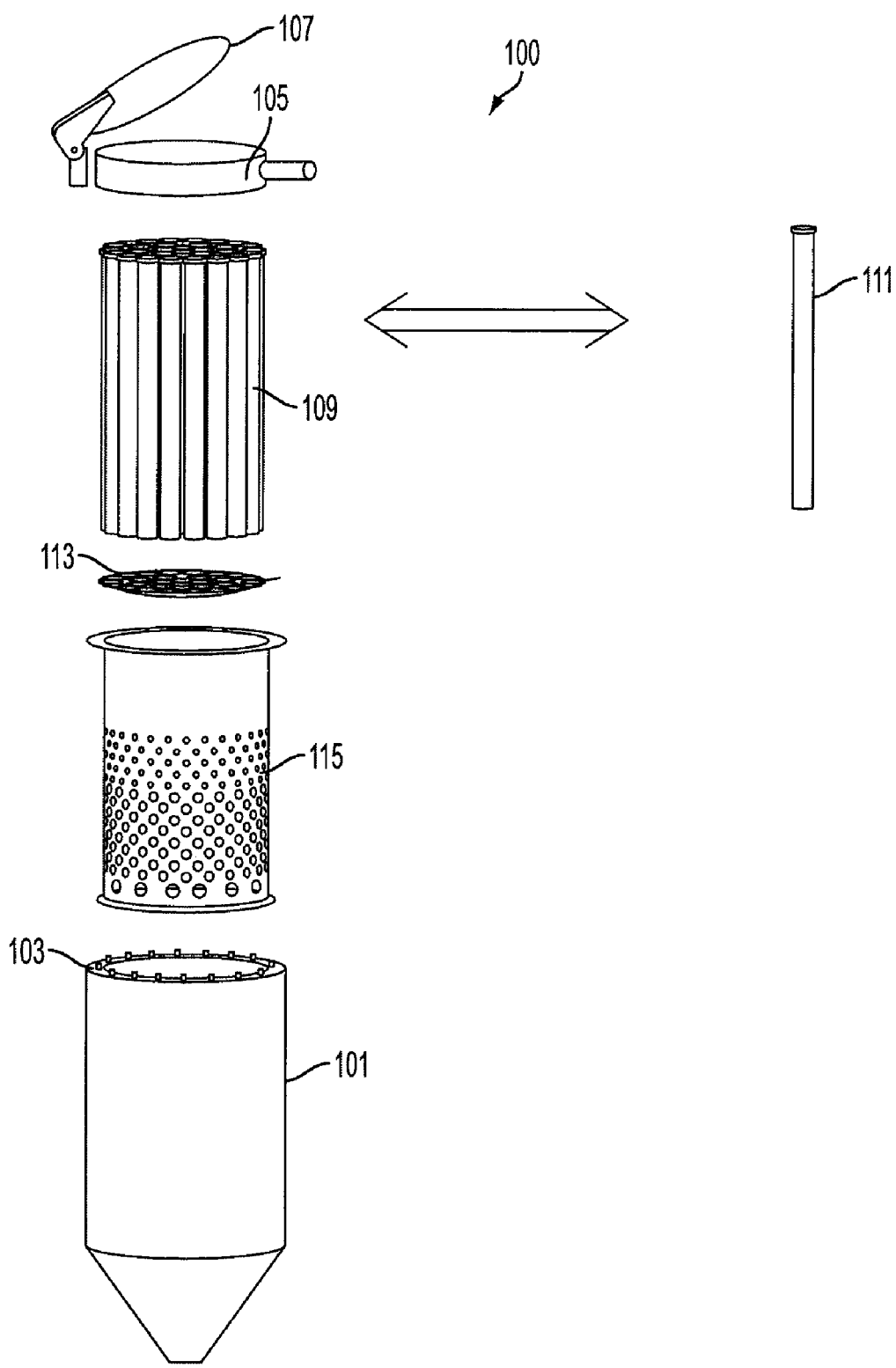
FIG. 1 is an illustration of a prior art cyclonic separation system having a plurality of filter tubes mounted within a cyclonic chamber using a filter tube plate having a plurality of filter tube holes.

The present disclosure provides a cyclonic separation system filter cartridge that includes a cylindrical filter body formed from a filter material into at least thirty pleats having a solid bottom surface and an open top surface, wherein outwardly extending edges of the plurality of pleats form an approximate outer diameter of the cylindrical filter body. The cylindrical filter body also includes a rigid inner cylindrical core disposed longitudinally within the center of the cylindrical filter body, such that the rigid inner cylindrical core forms an inner wall and the inner diameter of the cylindrical filter body. A top cap member substantially covers the open top surface except for a central circular opening having a diameter equal to the inner diameter, which is the diameter of the rigid inner cylindrical core. The embodiments also include a handle attached to either the rigid inner cylindrical core or to the top cap member, or both, that extends across the inner diameter and enables lifting of the filter cartridge.

In some embodiments, the cylindrical filter body has a length approximately equal to the length of a cyclonic separation chamber, and the approximate outer diameter is less than, but approximately equal to, the inner diameter of the cyclonic separation chamber such that the cylindrical filter body fits within the cyclonic separation chamber. For example, the cyclonic separation system filter cartridge body length may be approximately 42 inches. The inner diameter may be approximately 5 inches, and the outer diameter may be approximately 19 inches.

In some embodiments, the cylindrical filter body may be formed from a porous filter media having a 5 micron pour size. The filter media may a porous plastic material, such as, but not limited to polyethylene. The rigid inner cylindrical core may be formed from a stainless steel mesh and the handle may be a molded handle formed from a plastic that is attached to the inner cylindrical core. The cyclonic separation system filter cartridge may also include a bottom cap member that forms the solid bottom surface of the pleats. The top cap member and the bottom cap member may be formed from the same material.

The embodiments herein disclosed also provide a cyclonic separation system, filter cartridge mounting apparatus that includes a top mounting flange, a retainer plate, removably connectable to the top mounting flange, a bottom plate; and tie bracing connected to the mounting flange and the bottom plate, wherein the mounting apparatus is configured to be mounted, via the top mounting flange, within a cyclonic separation chamber, wherein the tie bracing is configured to extend along an internal wall of the separation chamber. The filter cartridge mounting apparatus may also include a ring, wherein a bottom surface of the ring is connected to a top surface of the bottom plate and wherein an outer wall of the ring is connected to an internal surface of the tie bracing. The ring configured to surround an outer diameter of a cylindrical filter cartridge to restrict movement of the filter cartridge when placed within the filter cartridge mounting apparatus. In some embodiments the tie bracing may include a plurality of longitudinal tie brace members, where each longitudinal tie brace member has a top end connected to the mounting flange and a bottom end connected to the bottom plate.

The top mounting flange may include an outwardly extending radial flange portion having a plurality of holes, wherein a bottom surface of the outwardly extending radial flange portion is configured to contact a mounting flange of the cyclonic separation chamber. The top mounting flange may also include an axially extending flange portion and an inwardly extending radial flange portion, extending inwardly from the axially extending flange portion, and having a plurality of holes. The outer surface of the retainer plate contacts the axially extending flange portion of the top mounting flange, and a portion of a bottom surface of the retainer plate contacts the inwardly extending radial flange, and is connected to the top mounting flange by bolts.

In some embodiments, the top mounting flange may also include a plurality of nuts corresponding to the plurality of holes of the inwardly extending radial flange portion, where each nut is aligned with a corresponding bolt hole on the inwardly extending radial flange portion, and is welded to the bottom surface. That is, the nuts secure a corresponding bolt passed through the retainer plate and the inwardly extending radial flange portion of the top mounting flange to fasten the retainer plate to the top mounting flange. The retainer plate extends inwardly and overlaps the inwardly extending radial flange portion of the top mounting flange, so that it further overlaps a portion of a cylindrical filter cartridge top to restrict its movement when placed within the filter cartridge mounting apparatus.

The embodiments herein disclosed also provide a cyclonic separation system, filter apparatus including a cylindrical filter body formed from a suitable filter material into at least thirty pleats having a solid bottom surface and an open top surface. The outwardly extending edges of the plurality of pleats form an approximate outer diameter of the cylindrical filter body. The cylindrical filter body also includes a rigid inner cylindrical core disposed longitudinally within the center of the cylindrical filter body, such that the rigid inner cylindrical core forms an inner wall and defines the inner diameter of the cylindrical filter body. A top cap member substantially covers the open top surface except for a central circular opening having a diameter equal to the inner diameter. A handle is included and is attached to either the rigid inner cylindrical core or to the top cap member, or to both, and extends across the inner diameter. A corresponding filter cartridge mounting apparatus is also included in the cyclonic separation system, filter apparatus.

The filter cartridge mounting apparatus includes a top mounting flange; a retainer plate, removably connectable to the top mounting flange; a bottom plate; tie bracing connected to the mounting flange and the bottom plate, wherein the mounting apparatus is configured to be mounted, via the top mounting flange, within a cyclonic separation chamber, wherein the tie bracing is configured to extend along an internal wall of the separation chamber; and a ring, wherein a bottom surface of the ring is connected to a top surface of the bottom plate and wherein an outer wall of the ring is connected to an internal surface of the tie bracing, the ring configured to surround an outer diameter of the cylindrical filter cartridge to restrict movement of the filter cartridge.

The embodiments herein disclose also provide a method of replacing a filter cartridge of a cyclonic separation system, which includes removing a top retainer plate from a cyclonic separation system, filter cartridge mounting apparatus; removing a single cylindrical filter cartridge from the filter cartridge mounting apparatus; replacing the single cylindrical filter cartridge with a different single cylindrical filter cartridge within the filter cartridge mounting apparatus; and replacing the top retainer plate. The single cylindrical filter cartridge may be removed by pulling the single cylindrical filter cartridge out of the filter cartridge mounting apparatus using a handle attached to the top inner core of the single cylindrical filter cartridge.

It is to be understood that terms used herein such as "first," "second," "left," "right," "upper," "lower," "top," "bottom," etc., are relational terms useful for describing the position or location of various components relative to others and that this language is used herein for such descriptive purposes only and is not to be in any way considered as imposing limitations on the various embodiments herein described.

Further the terms "configured to" as used herein, particularly as used within the claims appended hereto, indicate to those of ordinary skill that the various components herein described may be and/or have been dimensioned and/or designed to accommodate and cooperate with components of cyclonic separation systems, such as for example, cyclonic separation chambers, etc, such that, in the case of the herein described filter cartridge and mounting apparatus, these components will fit within, and the filter cartridge mounting apparatus will be connectable to, a respective cyclonic separation chamber. Therefore, while exemplary dimensions are provided with respect to exemplary embodiments, those of ordinary skill will understand that the herein described filter cartridge and mounting apparatus and assembly may be dimensioned as needed for any specific cyclonic separation chamber and that such variations are within the scope of the embodiments herein described and as claimed.

The terms "approximately equal" and "approximately" are used in reference to dimensions related to fitting the filter cartridge and filter cartridge mounting apparatus appropriately with an cyclonic separation chamber. Therefore the word "approximately" as used herein refers to a range, such as a range in inches, wherein such range may be from 1 to 12 inches.

Figure 2:
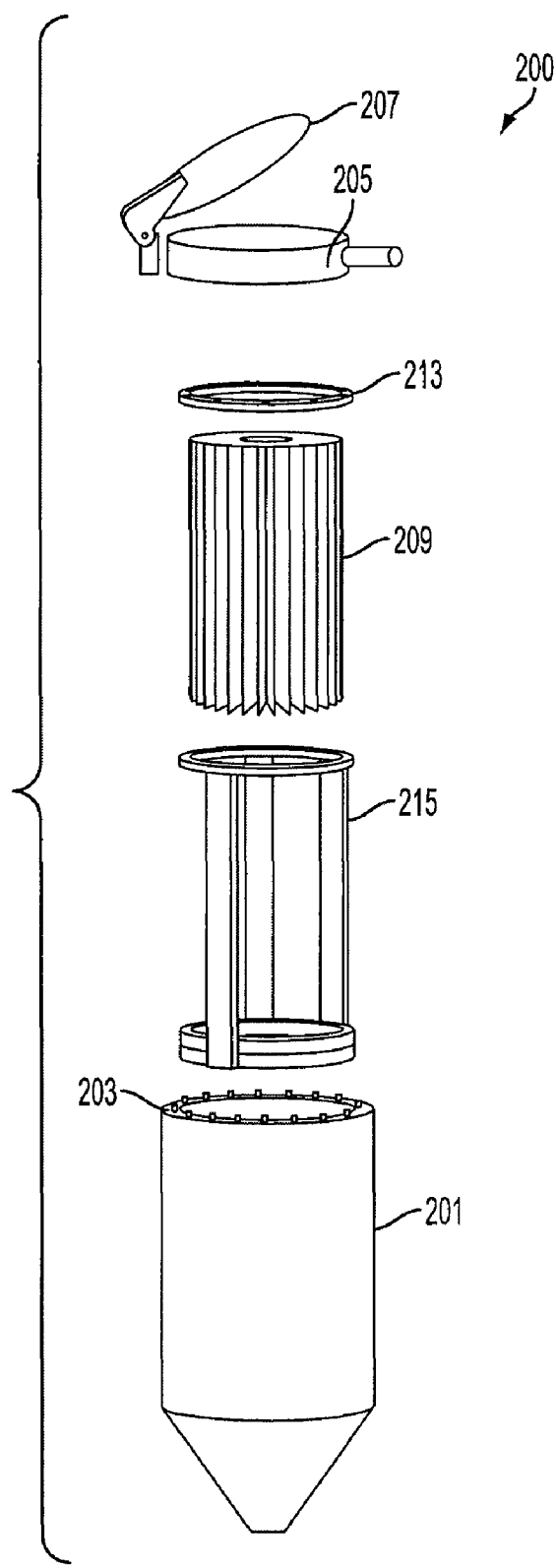
FIG. 2 illustrates a cyclonic separation system in accordance with the embodiments.

Turning now to the drawings wherein like numerals represent like components, FIG. 2 illustrates a cyclonic separation system in accordance with an embodiment. The cyclonic separation system includes a cyclonic separation chamber 201 which has a mounting flange 203 and a conical bottom portion from which separated particles may be removed. The cyclonic chamber includes a manifold which may be a separate manifold such as manifold 205, and a hinged cover 207. In accordance with the embodiments the cyclonic separation system 200 includes a single pleated filter cartridge 209 which is inserted into a filter brace 215 and secured therein by a retainer plate 213. The filter brace 215 may be considered a filter mounting apparatus that is configured to fit within the cyclonic separation chamber 201. The filter brace, having the single pleated filter cartridge 209, is mounted within the cyclonic chamber 201 and secured to the mounting flange 203.

Figure 3:
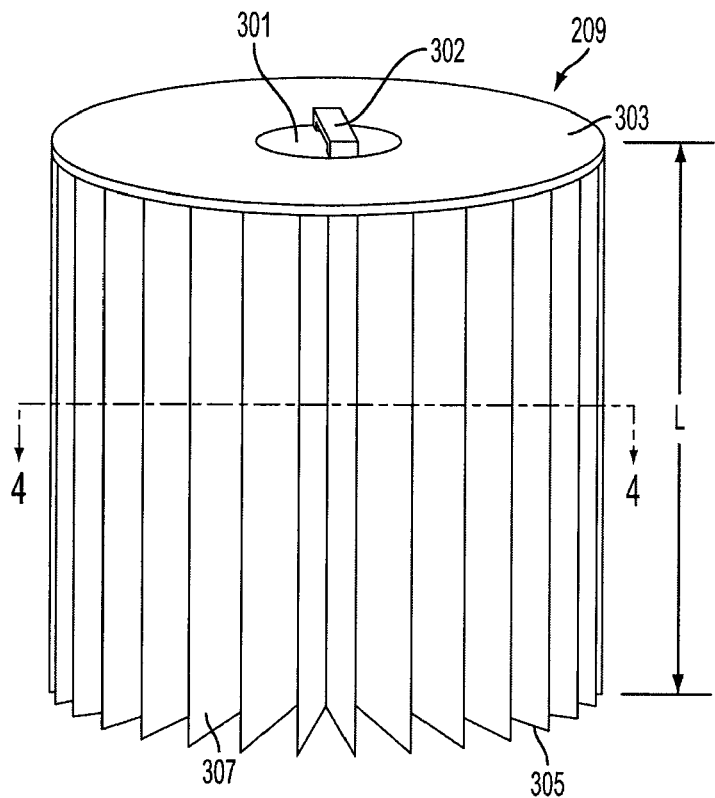
FIG. 3 illustrates a single filter cartridge for replacing a plurality of filter tubes in accordance with an embodiment.
Figure 4:
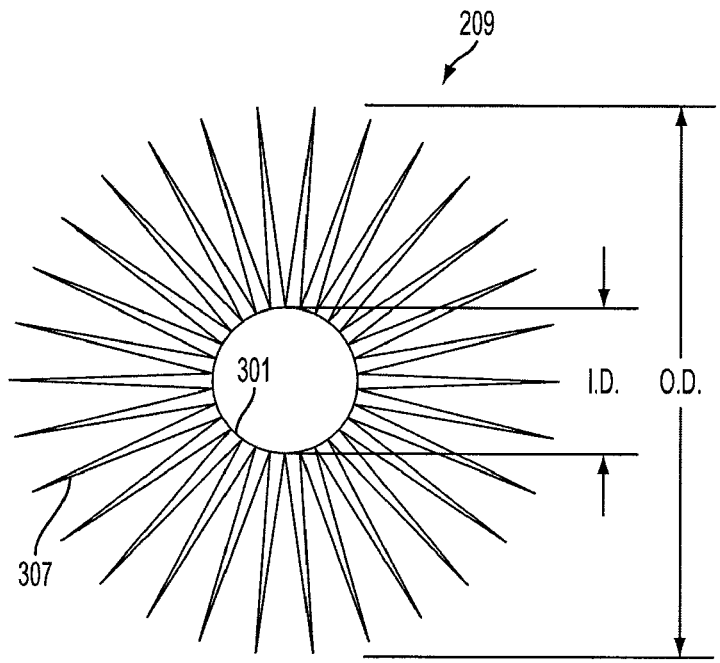
FIG. 4 provides a cross-sectional top view of the single filter cartridge illustrated in FIG. 3.

FIG. 3 illustrates a single pleated filter cartridge 209 in accordance with an embodiment. FIG. 4 shows a cross-sectional top view of the single filter cartridge 209 illustrated in FIG. 3. The single filter cartridge 209 is fabricated from a porous material, which, in some embodiments, may be a porous plastic, such as, but not limited to, polyethylene, such as high-density polyethylene (HDPE). However, any other suitable material may be used. Also in some embodiment, the filter media will provide a 5 micron pore size. The filter cartridge may include a top cap member 303, which is a gasket like member, and which may be formed from polyurethane or polypropylene, however any suitable material may be used. The top cap member 303 may include a handle 302 attached, for example, at the outer edges of the inner open portion of the top cap member 303. The inner open portion of the top cap member 303 is about the same diameter as the inner core 301. The single filter cartridge 209 may also include a bottom cap member (not shown) that entirely covers the bottom portions of the plurality of pleats 307 and forms a solid bottom surface in some embodiments. However, in other embodiments, the solid bottom surface of the plurality of pleats 307 may be fabricated from the same material as the plurality of pleats 307 and form a bottom covering. The top cap member 303, and bottom cap member that may be present in some embodiments, may be formed from the same material such as, but not limited to, polyurethane or polypropylene, or any other suitable material.

The filter media is used to form a plurality of pleats 307 that surround an inner wall formed by the inner core 301. The inner core 301 forms and provides an inner diameter ("I.D.") of the overall filter cylindrical body and provides rigidity to the overall filter structure. The outer edges of the plurality of pleats 307, that extend outwardly from the inner core 301, form an approximate corresponding outer diameter ("O.D") of the cylindrical body as shown in FIG. 3 and FIG. 4.

The single filter cartridge 209 plurality of pleats 307, form a plurality of filtration chambers similar to the filter tubes 111 of the prior systems such as prior system 100. In one exemplary embodiment, 30 pleats form the body of the single filter cartridge 209. The dimensions of the single filter cartridge 209 are configured to be proportionate to, and such that the filter cartridge 209 covers a substantial volume of, the cyclonic separation chamber 201. For example, in some embodiments, the single filter cartridge 209 will have an overall length designated as L in FIG. 3, of approximately 42 inches. As shown in FIG. 4, the inner diameter designated as I.D. will in some embodiments be approximately 5 inches while the outer diameter designated O.D. in FIG. 4 will be approximately 19 inches. The single filter cartridge 209 also includes a solid bottom surface 305 which is a solid surface. The bottom surface 305 may include, in some embodiments, an end cap similar to cap 303, but without an open center, as was discussed above.

Figure 5:
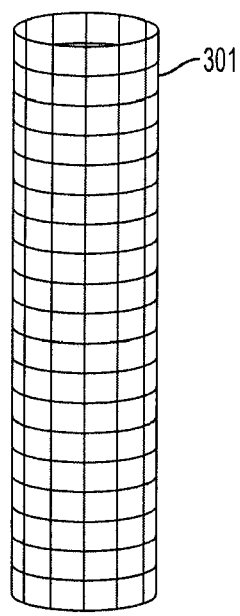
FIG. 5 illustrates the inner core of the single filter cartridge illustrated in FIG. 3 and FIG. 4.

For the purpose of providing rigidity to the cylindrical body, the single filter cartridge 209 includes the inner core 301 which is illustrated in FIG. 5. This rigid inner core is made of a rigid material, such as, but not limited to stainless steel, and provides stability to the overall length L of the single filter cartridge 209. The inner core 301 may be fabricated as, for example, a stainless steel mesh. However, any suitable material may be used that provides the proper stability and rigidity as required. The single filter cartridge 209 in some embodiments, will also include a handle 302 across the inner diameter of the single filter cartridge 209. The handle 302 allows for easy installation and removability of the single filter cartridge 209 within the filter brace 215 after removal of the retainer plate 213 as will be described in further detail herein. The handle 302 may be fabricated from a molded plastic or any other suitable material and may be attached either to the inner core 301, the top cap member 303, or attached to both.

Figure 6:
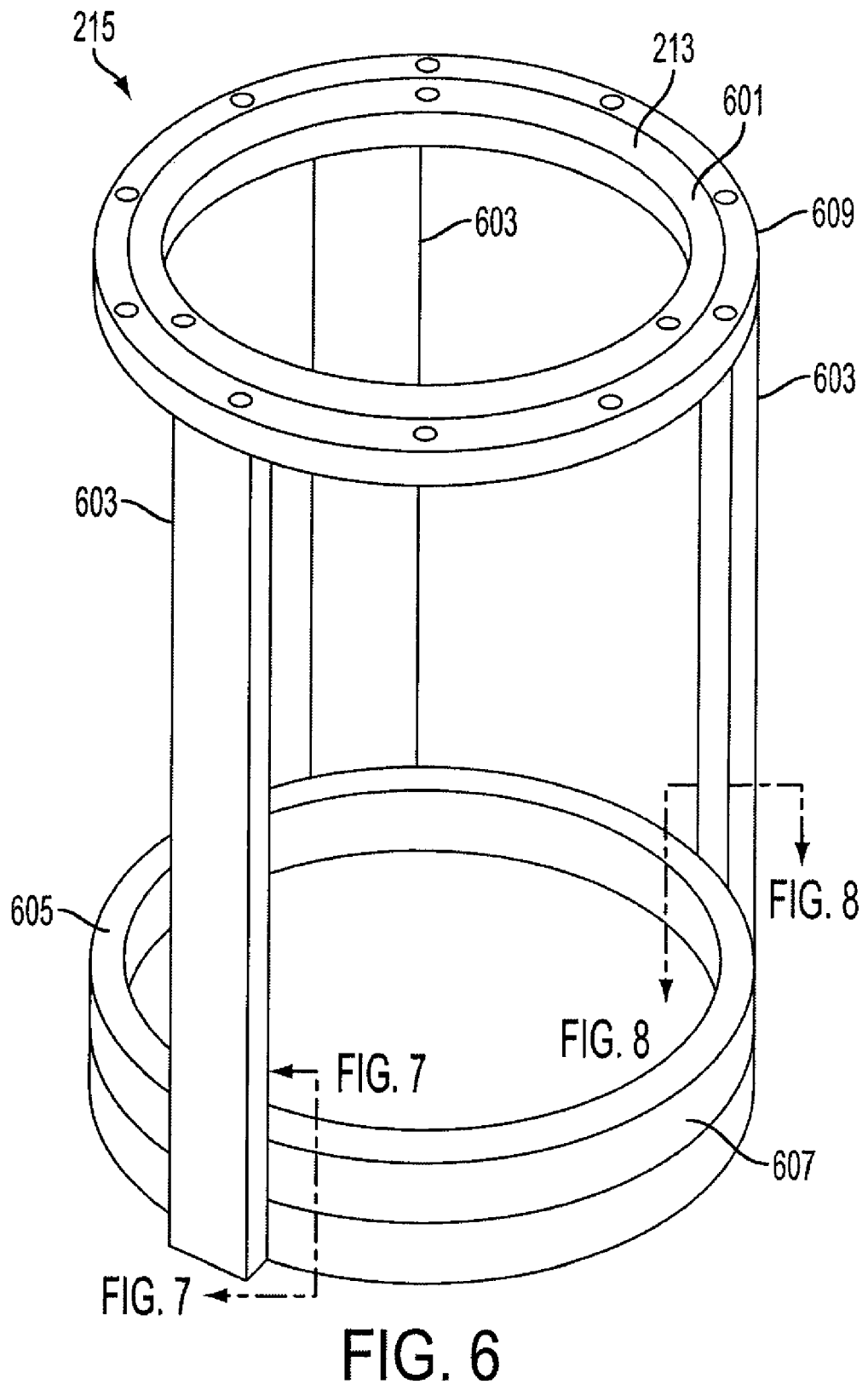
FIG. 6 illustrates a filter brace in accordance with an embodiment.

FIG. 6 is a perspective view and provides further details of the filter brace 215. The filter brace 215 may be constructed from any suitable material. In some embodiments, the filter brace 215 will be constructed from aluminum and will consist of a mounting flange 609 and a bottom plate 607 connected by tie bracing. In some embodiments, the tie bracing may utilize longitudinal tie brace members, such as 3 tie brace members 603 as shown. That is, the tie brace members are longitudinal in that they run in the axial direction of the cylindrical filter body axis (i.e. the tie brace members are "longitudinal" with the cylindrical filter body). However, any other suitable tie bracing may be employed in the various embodiments, and such individual tie brace members need not be used. The retainer plate 213 is configured to fit within an internal diameter of the mounting flange 609 and is mounted to the mounting flange 609 by 3 mounting bolts in one exemplary embodiment as will be described further herein.

Figure 7:
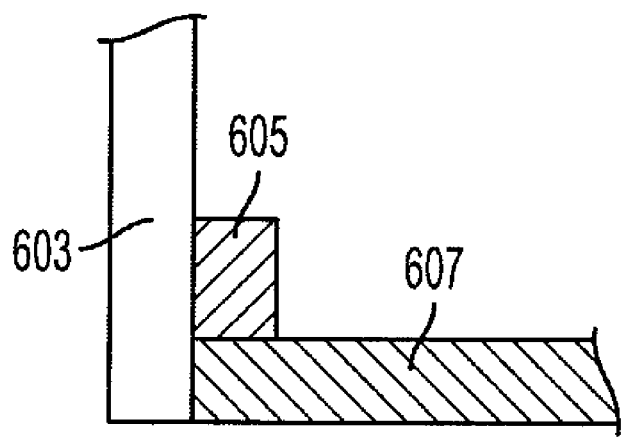
FIG. 7 is a cross sectional view taken from FIG. 6 and illustrates a cross section of a bottom plate and ring and its attachment to a tie brace.
Figure 8:
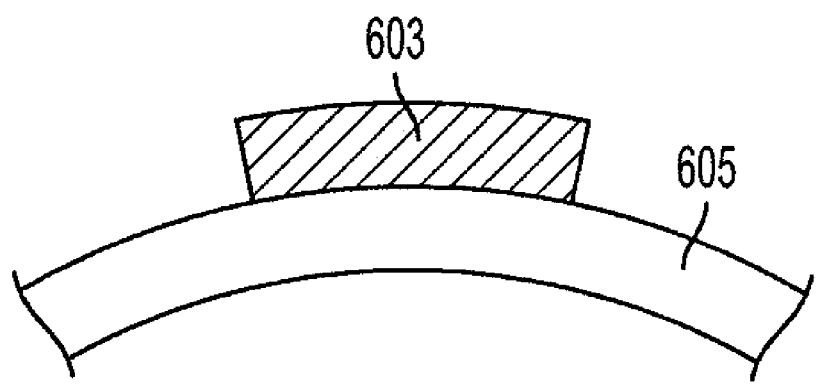
FIG. 8 is a cross section taken from FIG. 6 and illustrates the ring connected to a tie brace.

The filter brace 215 may also include a ring 605 which surrounds the bottom portion of the single filter cartridge 209 and prevents it from swaying within the filter brace 215. FIG. 7 provides a cross-section taken from FIG. 6 and shows further details of the bottom plate 607 and ring 605. As shown in FIG. 7 the tie brace 603 is connected to the bottom plate 607 and the ring 605. The ring 605 may be welded to the inner surface of the tie brace 603 and to the bottom plate 607. The tie brace 603 may be welded to the bottom plate 607. FIG. 8 provides another cross-sectional view taken from FIG. 6 and shows a top cross-sectional view of the tie brace member 603 connected to the ring 605. As shown in FIG. 7 the ring 605 sits on top the bottom plate 607. The tie braces 603 may be, in some embodiments, a one-half inch thick aluminum bar and may have a rectangular cross-section as shown. However, as noted above, any suitable tie bracing may be used and therefore any suitable cross-section of tie brace member or members may be employed. The bottom plate 607 may be a half inch thick aluminum plate. Likewise the ring 605 may be a half inch thick by approximately one inch high aluminum ring. However, any suitable dimensions may be used for the various components described herein provided that sufficient rigidity and stability of the filter brace 215 is provided.

Figure 9:
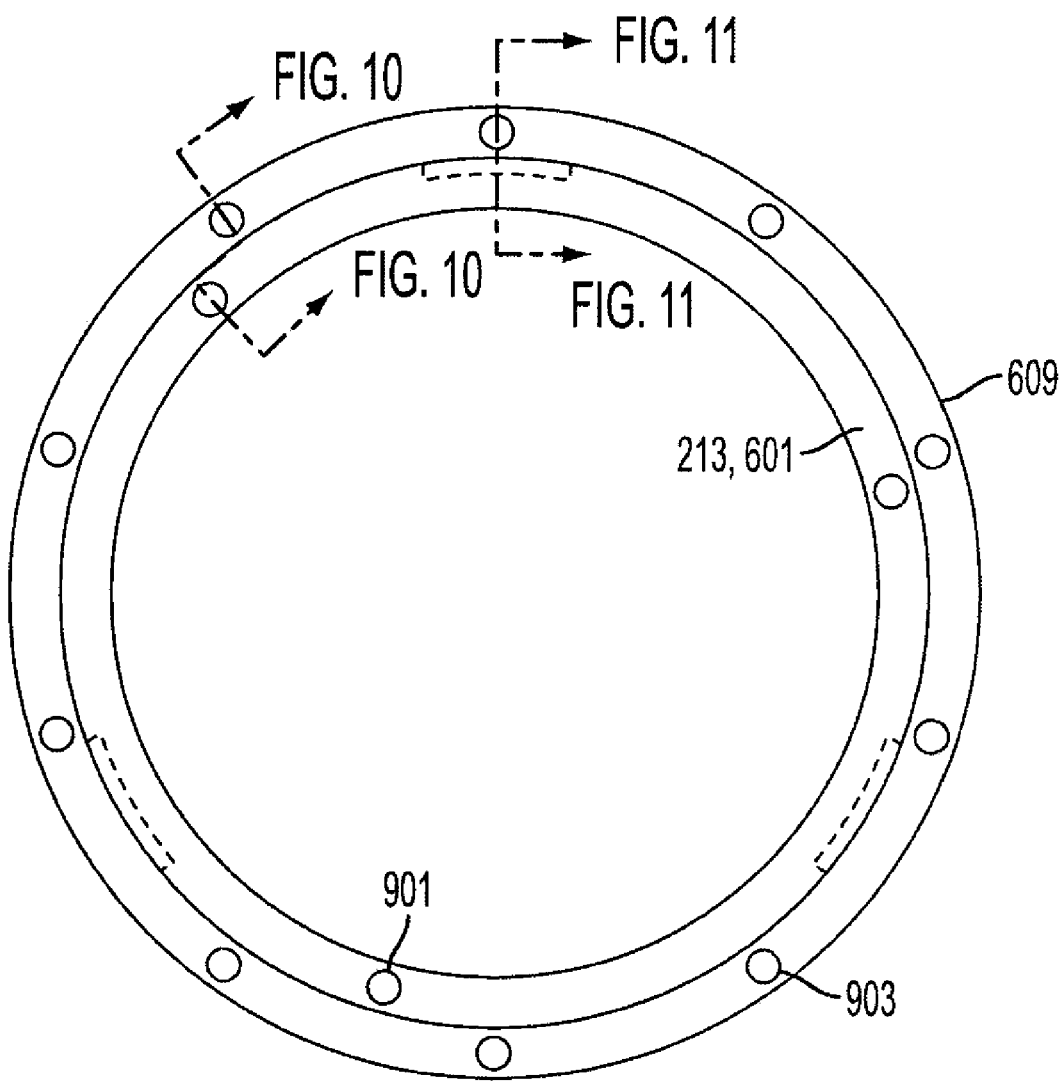
FIG. 9 is top view of the filter brace and shows the top of the mounting flange and the retainer plate and gasket.

FIG. 9 provides a top view of the filter brace 215 and shows the mounting flange 609 and the retainer plate 213. As shown in FIG. 9 the retainer plate 213 may have at least 3 retainer plate mounting holes 901 which line up with corresponding retainer plate mounting holes 901 located on an inwardly extending radial flange portion of mounting flange 609. Also as seen in FIG. 9, the mounting flange 609 has a plurality of mounting flange mounting holes 903 which are used to connect the mounting flange 609 to the mounting flange 203 of the cyclonic chamber 201 as shown in FIG. 2.

Therefore, turning briefly to FIG. 2, the filter brace 215 is inserted within the cyclonic chamber 201 such that an outwardly extending radial flange portion of the mounting flange 609 comes into contact with the mounting flange 203. The mounting flange mounting holes 903 are then aligned with the mounting flange 203 and the filter brace 215 is thereby connected to the cyclonic chamber 201. Also shown in FIG. 9 is that the retainer plate 213 includes a surface gasket 601. The surface gasket 601 may be a rubber material or any other suitable gasket material.

Figure 10:
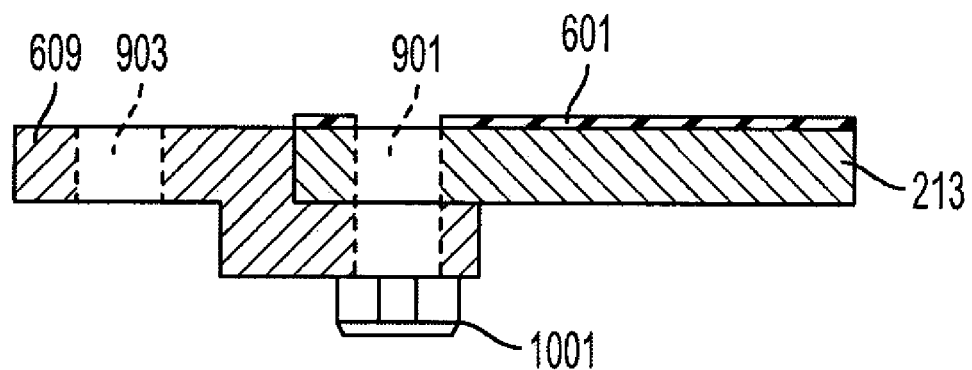
FIG. 10 is a cross sectional view taken from FIG. 9 and shows a cross section of the mounting flange and retainer plate and gasket.
Figure 11:
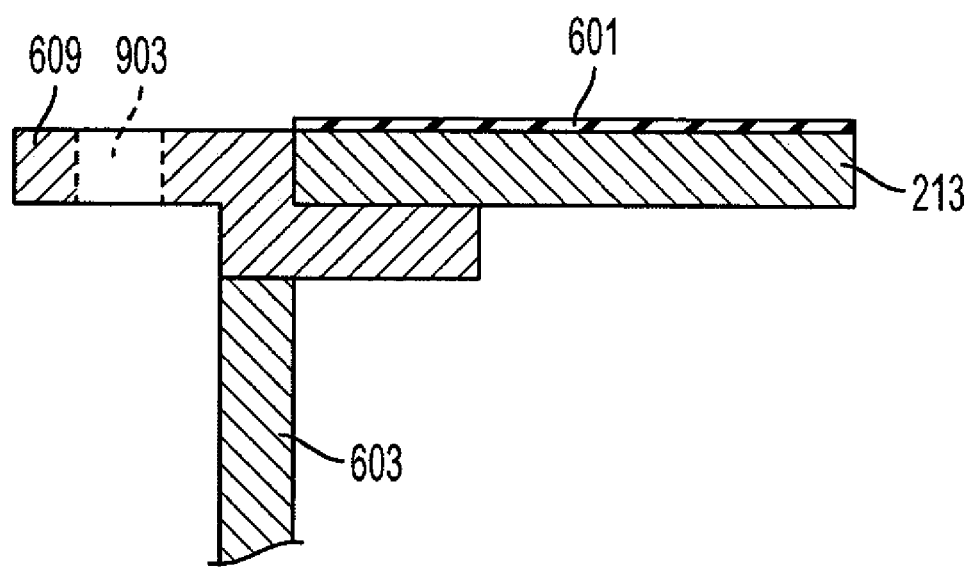
FIG. 11 is a cross sectional view taken from FIG. 9 and shows the mounting flange connected to a tie brace.

FIG. 10 and FIG. 11 provide cross sectional views taken from FIG. 9. FIG. 10 illustrates a cross section of the mounting flange 609 and shows one of the filter brace mounting holes 903. As can be seen in FIG. 10 the mounting flange 609 includes an outwardly extending radial flange portion, an axially extending flange portion, and an inwardly extending radial flange portion. The outwardly extending radial flange portion includes the filter brace mounting hole 903.

The retainer plate 213 is mounted to the mounting flange 609 such that the outer surface of the retainer plate 213 contacts the axially extending flange portion of the mounting flange 609. The bottom surface of retainer plate 213 contacts the inwardly extending radial flange portion of the mounting flange 609 and is bolted thereto. As shown in FIG. 10, the inwardly extending radial flange portion of the mounting flange 609 includes nuts 1001 aligned with the retainer plate mounting holes 901, which are welded to the bottom surface of the inwardly extending radial flange portion.

Therefore the bottom surface of the retainer plate 213 sits upon and makes contact with the mounting flange 609 and the outer edge or outer surface of the retainer plate 213 contacts the axially extending flange portion of the mounting flange 609. The retainer plate 213 mounting bolt holes 901 are aligned with corresponding retainer plate mounting bolt holes of the mounting flange 609, and passed through and secured into the welded nuts 1001. Therefore the retainer plate 213 is secured to the mounting flange 609 by for example, 3 bolts.

Turning again briefly to FIG. 2, one of ordinary skill would understand that the retainer plate 213 may be of a diameter less than the inner diameter of the manifold 205, such that the retainer plate 213 may be unbolted from the mounting flange 609 and removed through the manifold 205 by opening the hinged cover 207. The single filter cartridge 209 may then be easily removed and replaced. Among other advantages, the single pleated filter cartridge 209 is replaced within a matter of minutes rather than taking several hours as was required with the replacement of the plurality of filter tubes 109 as illustrated in the prior cyclonic separation system 100 illustrated in FIG. 1. Further the single filter cartridge 209 is washable such that it may be cleaned and replaced rather than replaced by an entirely new single filter cartridge 209. The handle 302 facilitates the easy removal and replacement of the single filter cartridge 209 through the top opening of the cyclonic chamber cyclonic separation system 200 assembly.

FIG. 11 illustrates another cross section taken from FIG. 9, and shows the mounting flange 609 attached to a tie brace 603. The top of the tie brace member 603 may be welded to an appropriate point on the bottom surface of the mounting flange 609 inwardly extending radial flange portion, or may be connected by bolts having counter sunk bolt holes within the mounting flange 609. However, in most embodiments, the tie brace members 603 will be welded to the mounting flange 609. FIG. 9 also shows that the retainer plate 213 outer surface fits within the inner diameter portion of the mounting flange 609. The surface of the retainer plate 213 may be flush with the surface of the mounting flange 609 is some embodiments. The retainer plate 213 also includes a gasket 601, which as discussed above may be a rubber material or other suitable material. That is, any suitable gasket material may be used for the gasket 601.

Figure 12:
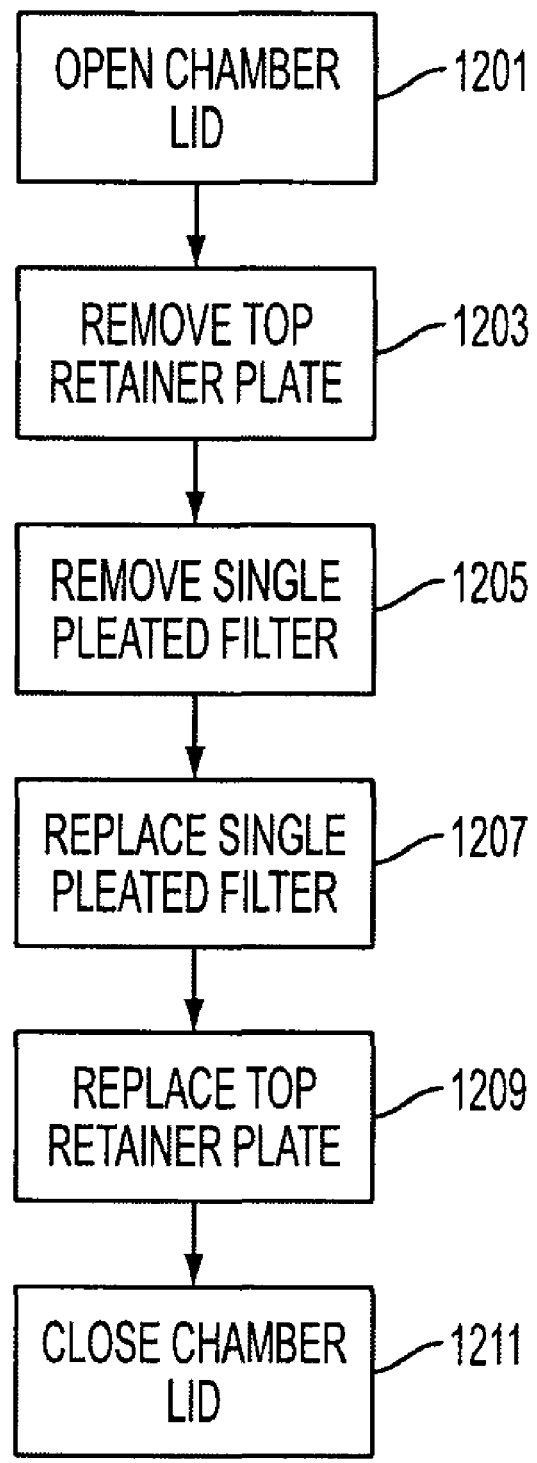
FIG. 12 is a flowchart illustrating operation for replacement of the single filter.

FIG. 12 is a flowchart illustrating the replacement of the single filter cartridge 209 in accordance with the embodiments. Using, as an exemplary cyclonic separation system, the cyclonic separation system 200 illustrated in FIG. 2, the flowchart of FIG. 12 begins in 1201 where the hinged cover 207 is opened to access the cyclonic separation chamber 201. The top retainer plate 213 is then removed as was described above, for example, by removing three bolts and lifting out the retainer plate 213. This is shown in 1203. In 1205, the single filter cartridge, which is a single pleated filter cartridge 209, may be removed by, for example, lifting up on the handle 302 and pulling the single filter cartridge 209 from the filter brace 215. The single filter cartridge 209 may then be washed, or, otherwise, a new single filter cartridge 209 may then be installed as shown in 1207. The top retainer plate 213 may then be replaced as shown in 1209 and the chamber cover 207 may be replaced and closed as shown in 1211. Therefore as illustrated in FIG. 12 the easy replacement capability facilitated by the single filter cartridge 209 of the embodiments has many advantages over the prior system which required replacement of a plurality of filter tubes. Further by having only a single filter cartridge to replace in accordance with the embodiments, there is no concern with contamination of the plurality of filter tubes by, for example, attempting to replace only one or more tubes and allowing contaminants to fall within the internal portion of the remaining filter tubes causing the remaining filter tubes to also require replacement. Among these and other advantages, one of ordinary skill would understand that the cost of operation of the cyclonic separation system 200 of the embodiments is much less than prior systems, such as the prior system illustrated in FIG. 1.

Therefore, cyclonic separation system apparatuses and methods of operation have been disclosed. Other variations that would be equivalent to the herein disclosed embodiments may occur to those of ordinary skill in the art and would remain in accordance with the scope of embodiments as defined herein by the following claims.

What is claimed is:

1. A cyclonic separation system filter cartridge comprising:
   a cylindrical filter body formed from a filter material into at least thirty pleats having a solid bottom surface and an open top surface, wherein outwardly extending edges of said plurality of pleats form an approximate outer diameter of said cylindrical filter body;
   a rigid inner cylindrical mesh core disposed longitudinally within the center of said cylindrical filter body, said rigid inner cylindrical mesh core forming an inner wall and an inner diameter of the cylindrical filter body;
   a top cap member substantially covering said open top surface except for a central circular opening having a diameter equal to said inner diameter; and
   a handle attached to either said rigid inner cylindrical core or to said top cap member, extending across said inner diameter.

2. The cyclonic separation system filter cartridge of claim 1, wherein said cylindrical filter body has a length approximately equal to the length of a cyclonic separation chamber, and wherein said approximate outer diameter is less than, but approximately equal to, the inner diameter of said cyclonic separation chamber such that said cylindrical filter body fits within said cyclonic separation chamber.

3. The cyclonic separation system filter cartridge of claim 2, wherein said cylindrical filter body length is approximately 42 inches.

4. The cyclonic separation system filter cartridge of claim 3, wherein said inner diameter is approximately 5 inches, and said outer diameter is approximately 19 inches.

5. The cyclonic separation system filter cartridge of claim 2, wherein said cylindrical filter body is formed from a porous filter media having a 5 micron pour size.

6. The cyclonic separation system filter cartridge of claim 5, wherein said filter media is a porous plastic material.

7. The cyclonic separation system filter cartridge of claim 6, wherein said porous plastic material is polyethylene.

8. The cyclonic separation system filter cartridge of claim 1, wherein said rigid inner cylindrical core is formed from a stainless steel mesh.

9. The cyclonic separation system filter cartridge of claim 1, wherein said handle is a molded handle formed from a plastic.

10. The cyclonic separation system filter cartridge of claim 1, further comprising:
   a bottom cap member forming said solid bottom surface of said plurality of pleats; and wherein said top cap member and said bottom cap member are formed from the same material.

11. A cyclonic separation system, filter cartridge mounting apparatus comprising:
   a top mounting flange;
   a retainer plate, removably connectable to said top mounting flange;
   a bottom plate; and
   tie bracing connected to said mounting flange and said bottom plate, wherein said mounting apparatus is configured to be mounted, via said top mounting flange, within a cyclonic separation chamber, wherein said tie bracing is configured to extend along an internal wall of said separation chamber.

12. The cyclonic separation system, filter cartridge mounting apparatus of claim 11, further comprising:
   a ring, wherein a bottom surface of said ring is connected to a top surface of said bottom plate and wherein an outer wall of said ring is connected to an internal surface of said tie bracing, said ring configured to surround an outer diameter of a cylindrical filter cartridge to restrict movement of said filter cartridge when placed within said filter cartridge mounting apparatus.

13. The cyclonic separation system, filter cartridge mounting apparatus of claim 11, wherein said tie bracing comprises:
   a plurality of longitudinal tie brace members, each longitudinal tie brace member having a top and bottom end, said top end connected to said mounting flange and said bottom end connected to said bottom plate.

14. The cyclonic separation system, filter cartridge mounting apparatus of claim 11, wherein said top mounting flange comprises:
   a outwardly extending radial flange portion having a plurality of holes, wherein a bottom surface of said outwardly extending radial flange portion is configured to contact a mounting flange of said cyclonic separation chamber.

15. The cyclonic separation system, filter cartridge mounting apparatus of claim 14, wherein said top mounting flange further comprises:
   an axially extending flange portion and an inwardly extending radial flange portion, extending inwardly from said axially extending flange portion, and having a plurality of holes, wherein an outer surface of said retainer plate contacts said axially extending flange portion of said top mounting flange, and wherein a portion of a bottom surface of said retainer plate contacts said inwardly extending radial flange, and is connected thereto via a plurality of bolts through said plurality of holes.

16. The cyclonic separation system, filter cartridge mounting apparatus of claim 15, wherein said top mounting flange further comprises:
   a plurality of nuts corresponding to said plurality of holes of said inwardly extending radial flange portion, each nut of said plurality of nuts aligned with a corresponding hole of said plurality of holes of said inwardly extending radial flange portion, and welded to a bottom surface of said inwardly extending radial flange portion, to receive a corresponding bolt through said retainer plate and said inwardly extending radial flange portion of said top mounting flange.

17. The cyclonic separation system, filter cartridge mounting apparatus of claim 16, wherein said retainer plate extends inwardly radially and overlaps said inwardly extending radial flange portion of said top mounting flange, to further overlap a portion of a cylindrical filter cartridge top to restrict movement of said filter cartridge when placed within said filter cartridge mounting apparatus.

18. A cyclonic separation system, filter apparatus comprising:
   a filter cartridge comprising:
      a cylindrical filter body formed from a filter material into at least thirty pleats having a solid bottom surface and an open top surface, wherein outwardly extending edges of said plurality of pleats form an approximate outer diameter of said cylindrical filter body;
      a rigid inner cylindrical core disposed longitudinally within the center of said cylindrical filter body, said rigid inner cylindrical core forming an inner wall and an inner diameter of the cylindrical filter body;
      a top cap member substantially covering said open top surface except for a central circular opening having a diameter equal to said inner diameter; and
      a handle attached to either said rigid inner cylindrical core or to said top cap member, extending across said inner diameter; and
   a filter cartridge mounting apparatus comprising:
      a top mounting flange;
      a retainer plate, removably connectable to said top mounting flange;
      a bottom plate;
      tie bracing connected to said mounting flange and said bottom plate, wherein said mounting apparatus is configured to be mounted, via said top mounting flange, within a cyclonic separation chamber, wherein said tie bracing is configured to extend along an internal wall of said separation chamber; and
      a ring, wherein a bottom surface of said ring is connected to a top surface of said bottom plate and wherein an outer wall of said ring is connected to an internal surface of said tie bracing, said ring configured to surround an outer diameter of said cylindrical filter cartridge to restrict movement of said filter cartridge.

19. A method of replacing a filter cartridge of a cyclonic separation system, the method comprising:
   removing a top retainer plate from a cyclonic separation system, filter cartridge mounting apparatus;
   removing a single pleated cylindrical filter cartridge from said filter cartridge mounting apparatus;
   replacing the single pleated cylindrical filter cartridge with a different single cylindrical filter cartridge within said filter cartridge mounting apparatus;
   replacing said top retainer plate.

20. The method of claim 19, wherein removing a single pleated cylindrical filter cartridge from said filter cartridge mounting apparatus, comprises:
   pulling said single pleated cylindrical filter cartridge out of said filter cartridge mounting apparatus using a handle attached to the top inner core of said single pleated cylindrical filter cartridge.

* * * * *